United States Patent
Upadhyay et al.

(10) Patent No.: US 8,406,745 B1
(45) Date of Patent: Mar. 26, 2013

(54) SYNCHRONIZATION OF VOICE MAIL GREETING AND EMAIL AUTO-REPLY BY A WIRELESS COMMUNICATION DEVICE

(75) Inventors: Piyush Upadhyay, Overland Park, KS (US); Badri Prasad Subramanyan, Overland Park, KS (US); Raghava V. Nidraghatta Karanam, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 268 days.

(21) Appl. No.: 12/695,712

(22) Filed: Jan. 28, 2010

(51) Int. Cl.
*H04M 11/10* (2006.01)
(52) U.S. Cl. .................. 455/413; 455/412.1; 455/412.2; 455/414.1; 455/414.2; 455/414.3; 455/414.4; 455/415; 455/425; 379/88.11; 379/88.26
(58) Field of Classification Search ....... 455/412.1–415, 455/425; 379/88.11–88.26
See application file for complete search history.

(56) References Cited

U.S. PATENT DOCUMENTS

| | | | |
|---|---|---|---|
| 7,298,833 B2 | 11/2007 | Klein et al. | |
| 2002/0129057 A1* | 9/2002 | Spielberg | 707/512 |
| 2005/0195954 A1 | 9/2005 | Klein et al. | |
| 2005/0201362 A1 | 9/2005 | Klein et al. | |
| 2006/0083358 A1* | 4/2006 | Fong et al. | 379/88.13 |
| 2007/0201634 A1* | 8/2007 | Bonnaud et al. | 379/88.13 |
| 2008/0127231 A1* | 5/2008 | Shaffer et al. | 719/328 |
| 2009/0024707 A1* | 1/2009 | Aase et al. | 709/206 |

* cited by examiner

*Primary Examiner* — Jinsong Hu
*Assistant Examiner* — Michael Nguyen

(57) ABSTRACT

A wireless communication device comprises a processing system, a user interface, and a wireless communication interface. The processing system is configured to receive a first email auto-reply instruction through the user interface, direct the wireless communication interface to transfer the first email auto-reply instruction for delivery to an email server, convert the first email auto-reply instruction into a voice mail greeting, and direct the wireless communication interface to transfer a first voice mail greeting instruction for delivery to a voice mail server. The processing system is further configured to receive a second voice mail greeting instruction through the user interface, direct the wireless communication interface to transfer the second voice mail greeting instruction for delivery to the voice mail server, convert the second voice mail greeting instruction into an email auto-reply, and direct the wireless communication interface to transfer a second email auto-reply instruction for delivery to the email server.

20 Claims, 6 Drawing Sheets

SYNCHRONIZATION OF VOICE MAIL GREETING AND EMAIL AUTO-REPLY BY A WIRELESS COMMUNICATION DEVICE

TECHNICAL BACKGROUND

Many individuals are increasingly utilizing wireless communication devices to remain in contact with business associates and friends. For example, a user of a wireless communication device may utilize voice calls, voice mail messages, email, Short Message Service (SMS) text messages, and Instant Messaging (IM) applications to stay in touch with various contacts. Typically, the user will often receive contact attempts through these communication services frequently throughout the day.

However, the user may not always be readily available to respond to such contact attempts. For example, the user of the wireless communication device may be in a meeting, on vacation, on sick leave, or otherwise indisposed and unable to respond. In the case of voice calls, a call to the user's wireless communication device will be forwarded to a voice mail service if the call is unanswered. The caller will then be presented with a voice mail greeting, which is typically a prerecorded message set by the user of the wireless communication device. In the case of email contacts, the user may set an automatic response, or auto-reply, which will be sent to the person attempting to contact the user via email to inform the person that the user is unavailable to respond to the email message. Similarly, the user may set an auto-reply message for SMS contacts. Finally, the user can perform an IM status update to inform IM contacts of the user's unavailability, and the user may also configure the IM service to respond automatically to instant messages received from IM contact attempts with an IM auto-reply message.

OVERVIEW

A wireless communication device comprises a processing system, a user interface, and a wireless communication interface. The processing system is configured to receive a first email auto-reply instruction through the user interface, and in response, direct the wireless communication interface to transfer the first email auto-reply instruction for delivery to an email server. In response to the first email auto-reply instruction, the processing system is further configured to convert the first email auto-reply instruction into a voice mail greeting and present the voice mail greeting through the user interface. The processing system is further configured to receive a first user acceptance of the voice mail greeting through the user interface, and in response to the first user acceptance, to direct the wireless communication interface to transfer a first voice mail greeting instruction for delivery to a voice mail server. The processing system is further configured to receive a second voice mail greeting instruction through the user interface, and in response, direct the wireless communication interface to transfer the second voice mail greeting instruction for delivery to the voice mail server. In response to the second voice mail greeting instruction, the processing system is further configured to convert the second voice mail greeting instruction into an email auto-reply and present the email auto-reply through the user interface. The processing system is further configured to receive a second user acceptance of the email auto-reply through the user interface, and in response to the second user acceptance, direct the wireless communication interface to transfer a second email auto-reply instruction for delivery to the email server.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
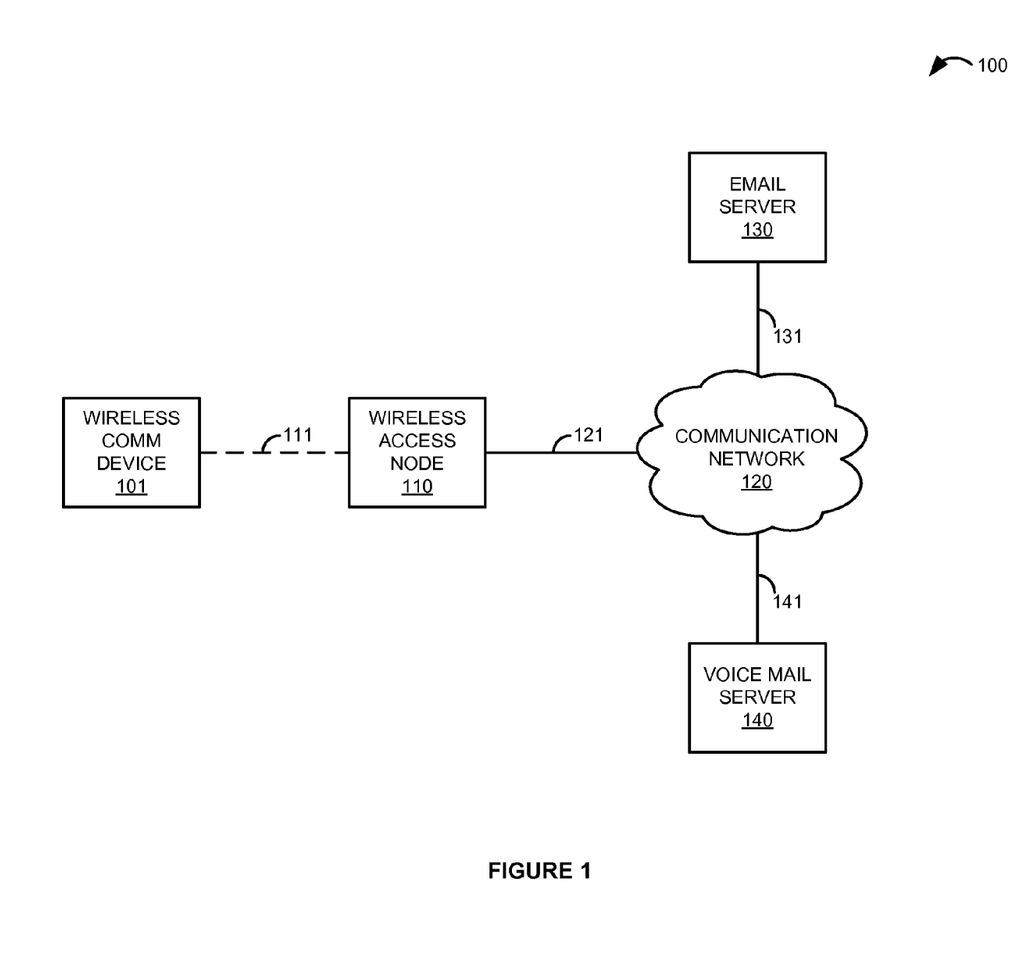
FIG. 1 is a block diagram that illustrates a communication system.

FIG. 1 is a block diagram that illustrates communication system 100. Communication system 100 includes wireless communication device 101, wireless access node 110, communication network 120, email server 130, and voice mail server 140. Wireless communication device 101 is in communication with wireless access node 110 over wireless communication link 111. Wireless access node 110 communicates with communication network 120 over communication link 121. Email server 130 communicates with communication network 120 over communication link 131. Voice mail server 140 is in communication with communication network 120 over communication link 141.

Figure 2:
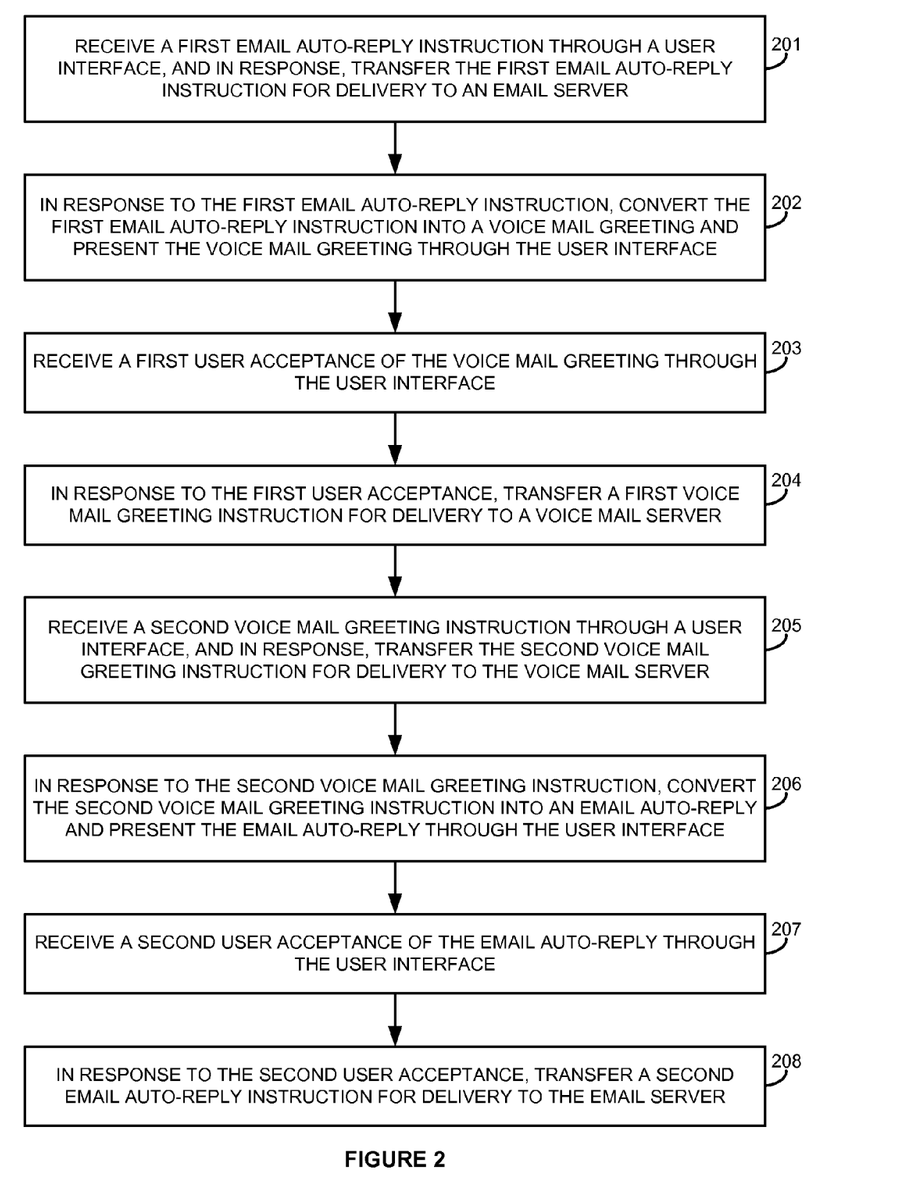
FIG. 2 is a flow diagram that illustrates an operation of the communication system.

FIG. 2 is a flow diagram that illustrates an operation of communication system 100. The steps of the operation are indicated below parenthetically. In FIG. 2, wireless communication device 101 receives a first email auto-reply instruction through a user interface, and in response, transfers the first email auto-reply instruction for delivery to email server 130 (201). The first email auto-reply instruction directs email server 130 to automatically respond to email received in an email account associated with wireless communication device 101. The first email auto-reply instruction could comprise any message, but typically takes the form of a notification to persons sending email to a user of wireless communication device 101 that the user is unavailable for immediate email response. For example, the first email auto-reply instruction could comprise a notification that the user is out of the office for the day, on lunch break, or on vacation, and could also include alternative contact information such as a telephone number and an expected date when the user will again be available.

In response to the first email auto-reply instruction, wireless communication device 101 converts the first email auto-reply instruction into a voice mail greeting and presents the voice mail greeting through the user interface (202). For example, wireless communication device 101 may utilize text-to-speech processing to convert the first email auto-reply instruction into the voice mail greeting. The voice mail greeting may then be presented to the user through the user interface by playing back the audio conversion of the first email auto-reply instruction through a speaker of wireless communication device 101, for example. Wireless communication device 101 presents the voice mail greeting through the user interface to ensure the user is satisfied with the text-to-speech conversion and to verify its accuracy. In some examples, wireless communication device 101 may prompt the user through the user interface to accept or reject the voice mail greeting converted from the first email auto-reply instruction. If the user is satisfied, wireless communication device 101 receives a first user acceptance of the voice mail greeting through the user interface (203).

In response to the first user acceptance, wireless communication device 101 transfers a first voice mail greeting instruction for delivery to voice mail server 140 (204). The first voice mail greeting instruction directs voice mail server 140 to update a personal greeting associated with wireless communication device 101 with the voice mail greeting converted from the first email auto-reply instruction in operation 202. For example, if the first email auto-reply instruction is converted from text to speech by wireless communication device 101 to generate an audible voice mail greeting, this converted greeting is stored by voicemail server 140 as the user's new personal greeting. In this manner, when a call is placed to wireless communication device 101 and the call is unanswered, the call is forwarded to voice mail server 140, which in turn plays back the voice mail greeting received from wireless communication device 101 in operation 204.

Wireless communication device 101 receives a second voice mail greeting instruction through the user interface, and in response, transfers the second voice mail greeting instruction for delivery to voice mail server 140 (205). The second voice mail greeting instruction directs voice mail server 140 to update a personal greeting associated with wireless communication device 101. The second voice mail greeting instruction could comprise any message intended for callers whose calls to wireless communication device 101 are unanswered and forwarded to voice mail server 140. However, the second voice mail greeting will typically provide a notification to persons attempting to contact the user of wireless communication device 101, such as the user's tentative schedule and anticipated time periods of unavailability.

In response to the second voice mail greeting instruction, wireless communication device 101 converts the second voice mail greeting instruction into an email auto-reply and presents the email auto-reply through the user interface (206). For example, wireless communication device 101 may utilize speech-to-text processing to convert the second voice mail greeting instruction into the email auto-reply. The converted email auto-reply may then be presented to the user through the user interface by displaying the converted text of the second voice mail greeting instruction on a display screen of wireless communication device 101, for example. Continuing this example, wireless communication device 101 presents the email auto-reply through the user interface to allow the user to verify its accuracy and ensure the user's satisfaction with the speech-to-text conversion. If the user is satisfied, wireless communication device 101 receives a second user acceptance of the email auto-reply through the user interface (207). For example, the user may provide the second user acceptance of the email auto-reply through the user interface of wireless communication device 101 by pressing a button, speaking a voice command, or providing some other input through the user interface.

In response to the second user acceptance, wireless communication device 101 transfers a second email auto-reply instruction for delivery to the email server (208). The second email auto-reply instruction directs email server 130 to automatically respond to email received in an email account associated with wireless communication device 101 with the email auto-reply converted from the second voice mail greeting instruction in operation 206. For example, if the second voice mail greeting instruction is converted from speech to text by wireless communication device 101 to generate a textual email auto-reply, this converted email auto-reply is stored by email server 130 as the user's new automatic response to email. In this manner, when an email is received by email server 130, server 130 will automatically respond to the sender with the email auto-reply converted from the second voice mail greeting instruction.

In some examples, the user of wireless communication device 101 may not desire to respond to every email received by email server 130 with the email auto-reply. In this case, the user may designate through the user interface a specific person or group of persons that may receive the email auto-reply. For example, wireless communication device 101 may receive a selection of a plurality of contacts through the user interface, and in response to the selection, the email auto-reply instruction could direct email server 130 to only present the email auto-reply in response to email received from the plurality of contacts. The plurality of contacts could comprise a list of email addresses. In some examples, the plurality of contacts could comprise a predetermined type of contacts, such as work contacts, relatives, or friends. In other examples, the plurality of contacts could comprise a predetermined group of contacts. For example, the user of wireless communication device 101 could generate the predetermined group of contacts by preselecting only certain contacts from a list of contacts associated with wireless communication device 101 or the email account associated with email server 130.

Advantageously, when wireless communication device 101 receives an email auto-reply instruction intended for email server 130, device 101 converts the email auto-reply instruction into a voice mail greeting and transfers the converted voice mail greeting to voice mail server 140. Likewise, when wireless communication device 101 receives a voice mail greeting update for voice mail server 140, device 101 converts the voice mail greeting into an email auto-reply and transfers the converted email auto-reply greeting to email server 130. In this manner, a user of wireless communication device 101 is not required to manually update the email auto-reply for email server 130 or the voice mail greeting for voice mail server 140, which may prevent the user from forgetting or neglecting to update one of these servers. In addition, persons attempting to contact the user of wireless communication device 101 will receive a current and relevant message from the user, regardless of the form of contact attempted.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Internet, telephony, or some other communication format—including combinations thereof.

Communication network 120 comprises the core network of a wireless communication provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, metropolitan-area networks (MAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Email server 130 comprises a computer system and communication interface. Email server 130 may also include other components such as a router, server, data storage system, and power supply. Email server 130 may reside in a single device or may be distributed across multiple devices. Email server 130 may be a discrete system or may be integrated within other systems—including other systems within communication system 100. Email server 130 could comprise a packet gateway, mobile switching center, network gateway system, Internet access node, application server, service node, firewall, or some other communication system—including combinations thereof.

Voice mail server 140 comprises a computer system and communication interface. Voice mail server 140 may also include other components such as a router, server, data storage system, and power supply. Voice mail server 140 may reside in a single device or may be distributed across multiple devices. Voice mail server 140 may be a discrete system or may be integrated within other systems—including other systems within communication system 100. Voice mail server 140 could comprise a packet gateway, mobile switching center, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport media—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
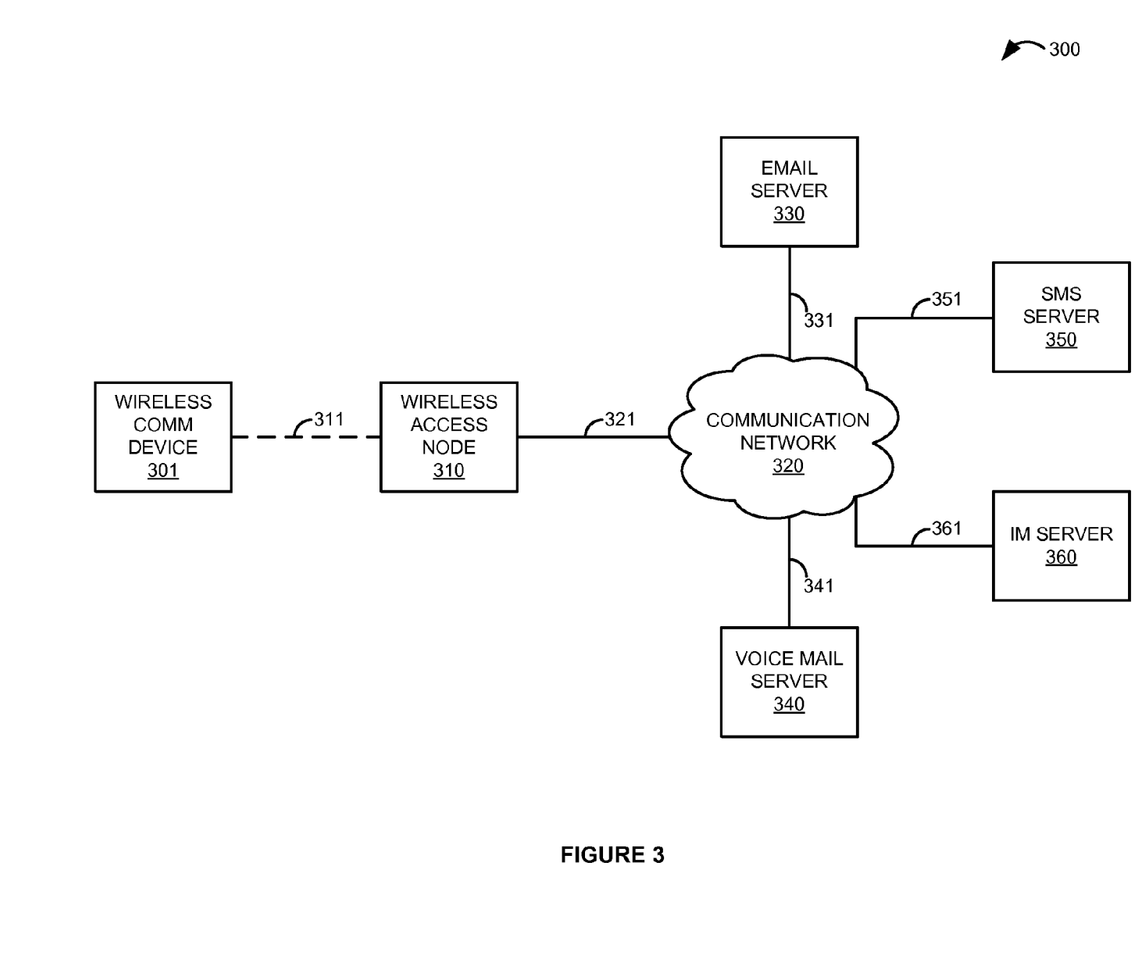
FIG. 3 is a block diagram that illustrates a communication system in an exemplary embodiment.

FIG. 3 is a block diagram that illustrates communication system 300 in an exemplary embodiment. Communication system 300 includes wireless communication device 301, wireless access node 310, communication network 320, email server 330, voice mail server 340, Short Message Service (SMS) server 350, and Instant Messaging (IM) server 360. Wireless communication device 301 is in communication with wireless access node 310 over wireless communication link 311. Wireless access node 310 communicates with communication network 320 over communication link 321. Email server 330 communicates with communication network 320 over communication link 331. Voice mail server 340 is in communication with communication network 320 over communication link 341. SMS server 350 communicates with communication network 320 over communication link 351. IM server 360 is in communication with communication network 320 over communication link 361.

Figure 4:
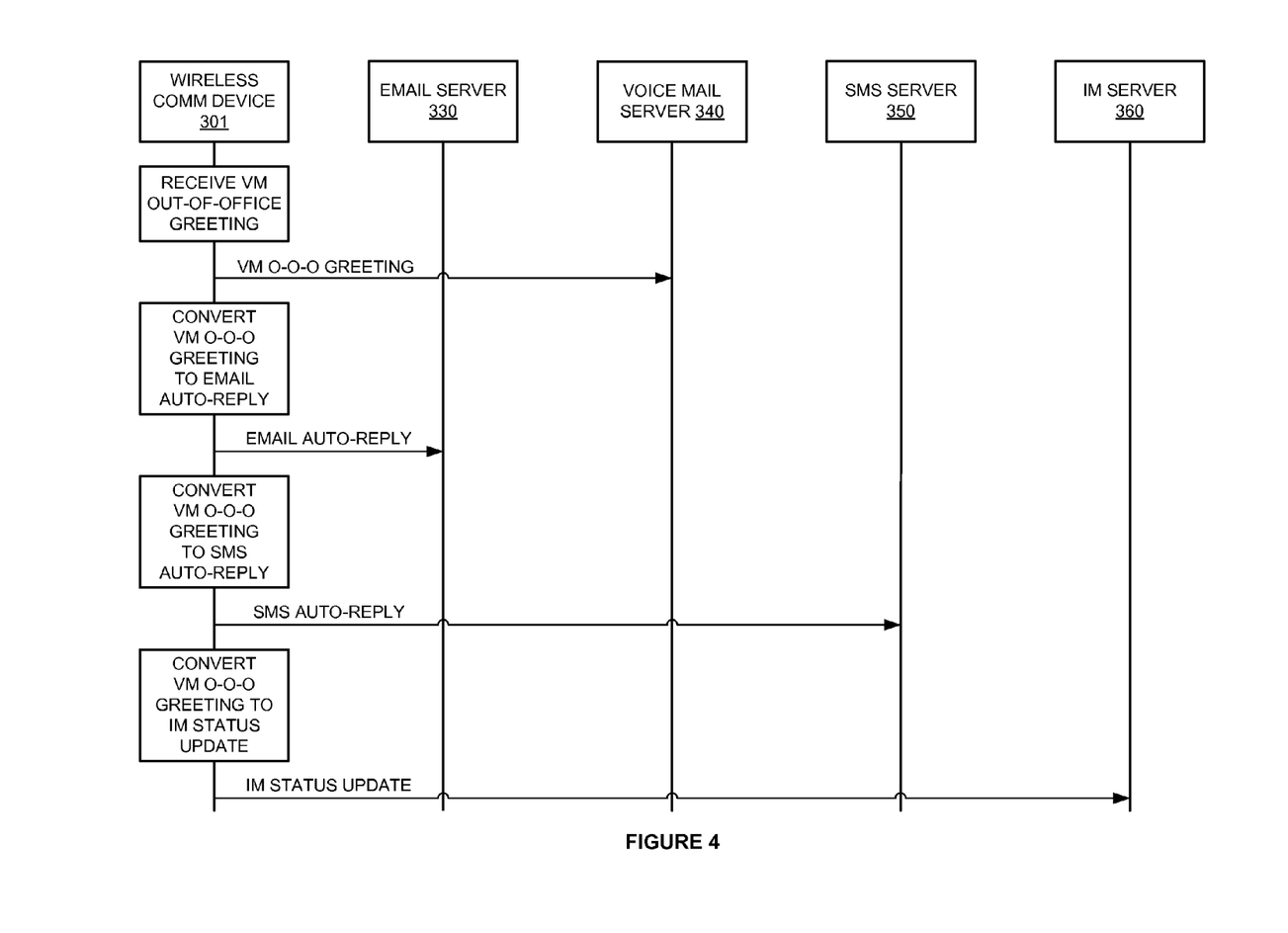
FIG. 4 is a sequence diagram that illustrates an operation of the communication system in an exemplary embodiment.

FIG. 4 is a sequence diagram that illustrates an operation of communication system 300 in an exemplary embodiment. Wireless communication device 301 is programmed with the user's various service accounts, and is therefore capable of communicating with email server 330, voice mail server 340, SMS server 350, and IM server 360 directly through communication network 320. In cases where one or more servers 330-360 are unknown to wireless communication device 301, device 301 may prompt the user for the necessary account information.

In FIG. 4, wireless communication device 301 receives a voice mail out-of-office greeting from a user through a user interface. The user provides the voice mail out-of-office greeting to wireless communication device 301 by accessing a voice mail application on device 301 and speaking a voice mail greeting. For example, the user may say "I am out of the office today; I will get back to you tomorrow morning." Upon receipt of the new voice mail out-of-office greeting, wireless communication device 301 transfers the voice mail greeting to voice mail server 340. Anyone calling wireless communication device 301 will have the call forwarded to voice mail server 340 if the call is unanswered, and voice mail server 340 will in turn play back the voice mail greeting recorded by the user of wireless communication device 301.

Next, wireless communication device 301 converts the audio recorded by the user when setting the voice mail out-of-office greeting into a text-based email auto-reply message. This conversion may be performed by speech-to-text engines installed on wireless communication device 301. Thus, the email auto-reply message comprises the same words recorded by the user when setting the voice mail out-of-office greeting. However, the email auto-reply could be preceded or appended with a default message by wireless communication device 301, such as the user's contact information or other predetermined message. In some examples, wireless communication device 301 prompts the user for permission before converting the voice mail out-of-office greeting into the email auto-reply message. The converted text may be displayed on a display screen of wireless communication device 301 for approval by the user before transmission to email server 330. Wireless communication device 301 then transfers the email auto-reply message to email server 330. Emails received by email server 330 associated with wireless communication device 301 will now receive an automatic response from email server 330 comprising the email auto-reply message.

Likewise, the user may desire a similar auto-reply message sent to people attempting to contact wireless communication device 301 with an SMS text message. Again, wireless communication device 301 may convert the audio of the voice mail out-of-office greeting into a text-based SMS auto-reply message, or device 301 may simply use the same email auto-reply message that was previously converted. Also, the SMS auto-reply could be preceded or appended with a default message by wireless communication device 301, such as the user's contact information or other predetermined message. Once the SMS auto-reply message is prepared, wireless communication device 301 transfers the SMS auto-reply message to SMS server 350. Contacts designated by the user of wireless communication device 301 will then receive the SMS auto-reply message when sending an SMS text message to wireless communication device 301. This ensures that device 301 does not automatically respond to SMS messages from unknown or undesignated contacts, such as spammers, who could exploit the information in the SMS auto-reply. Of course, wireless communication device 301 comprises the same option to limit automatic responses to only contacts specified by the user of wireless communication device 301 for the email and IM services as well.

Finally, the user may also wish to update an IM status with the same information recorded for the voice mail out-of-office greeting. The IM status informs the user's IM contacts of the current availability of the user of wireless communication device 301. As before, wireless communication device 301 may convert the audio of the voice mail out-of-office greeting into the IM status update, or device 301 may simply use the same email or SMS auto-reply message that was previously converted, if available. Wireless communication device 301 then transfers the IM status update to IM server 360. The IM clients of other users who have the user of wireless communication device 301 in their contacts list will display this IM status message associated with the user of device 301. Additionally or alternatively, wireless communication device 301 could also set an IM auto-reply message in a similar manner as described above. If wireless communication device 301 transfers an IM auto-reply message to IM server 360, designated persons who send an instant message to the user of device 301 will receive the IM auto-reply message in response.

The conversion steps and subsequent transmissions to servers 330, 350, and 360 depicted in FIG. 4 may be carried out automatically upon receiving the voice mail out-of-office greeting in wireless communication device 301, or device 301 may prompt the user for permission to perform each step before taking any action. In some examples, the user may set a global option to automatically update one or more of the servers 330, 350, and 360 when wireless communication device 301 receives a voice mail greeting update. Additionally, the user of wireless communication device 301 may designate certain individuals, or groups of individuals, as the only contacts to receive the respective auto-replies. This designation could also be service-specific. For example, the user of wireless communication device 301 could designate a first group of contacts to receive the email auto-reply in response to email messages, and a second group of contacts to receive the SMS auto-reply in response to SMS messages. The contacts designated to receive the auto-replies could be transferred to the email server 330, SMS server 350, and IM server 360 along with the email auto-reply, SMS auto-reply, and IM auto-reply, respectively. Persons attempting to contact the user of wireless communication device 301 over a respective service who are not in the designated list of contacts approved by the user for that service will receive a predetermined default automatic response, or no response.

Figure 5:
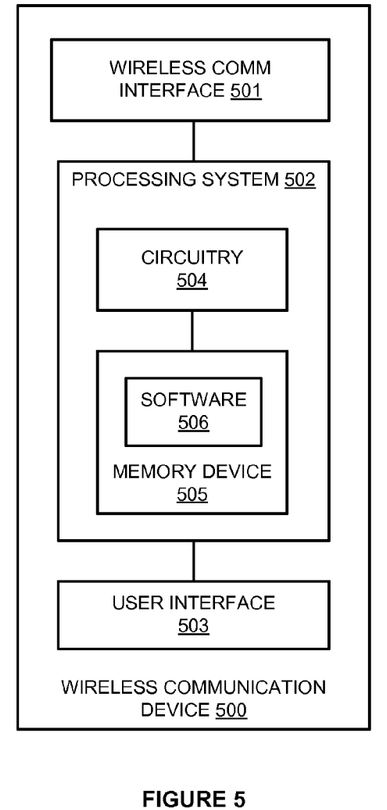
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication interface 501, processing system 502, and user interface 503. Processing system 502 is linked to wireless communication interface 501 and user interface 503. Processing system 502 includes processing circuitry 504 and memory device 505 that stores operating software 506. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication interface 501 comprises RF communication circuitry and an antenna. The RF communication circuitry typically includes an amplifier, filter, RF modulator, and signal processing circuitry. Wireless communication interface 501 may also include a memory device, software, processing circuitry, or some other communication device. Wireless communication interface 501 may use various protocols, such as CDMA, GSM, UMTS, HSPA, EV-DO, EV-DO rev. A, 3GPP LTE, WiMAX, Wi-Fi, or some other wireless communication format.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 may omitted in some examples.

Processing circuitry 504 comprises microprocessor and other circuitry that retrieves and executes operating software 506 from memory device 505. Memory device 505 comprises a disk drive, flash drive, data storage circuitry, or some other memory apparatus. Processing circuitry 504 is typically mounted on a circuit board that may also hold memory device 505 and portions of communication interface 501 and user interface 503. Operating software 506 comprises computer programs, firmware, or some other form of machine-readable processing instructions. Operating software 506 may include an operating system, utilities, drivers, network interfaces, applications, or some other type of software. When executed by processing circuitry 504, operating software 506 directs processing system 502 to operate wireless communication device 500 as described herein.

In particular, operating software 506 directs processing system 502 to receive a first email auto-reply instruction through user interface 503, and in response, direct wireless communication interface 501 to transfer the first email auto-reply instruction for delivery to an email server. In response to the first email auto-reply instruction, operating software 506 directs processing system 502 to convert the first email auto-reply instruction into a voice mail greeting and present the voice mail greeting through user interface 503. Operating software 506 directs processing system 502 to receive a first user acceptance of the voice mail greeting through user interface 503, and in response to the first user acceptance, direct wireless communication interface 501 to transfer a first voice mail greeting instruction for delivery to a voice mail server. Further, operating software 506 directs processing system 502 to receive a second voice mail greeting instruction through user interface 503, and in response, direct wireless communication interface 501 to transfer the second voice mail greeting instruction for delivery to the voice mail server. In response to the second voice mail greeting instruction, operating software 506 directs processing system 502 to convert the second voice mail greeting instruction into an email auto-reply and present the email auto-reply through user interface 503. Operating software 506 directs processing system 502 to receive a second user acceptance of the email auto-reply through user interface 503, and in response to the second user acceptance, direct wireless communication interface 501 to transfer a second email auto-reply instruction for delivery to the email server.

Figure 6:
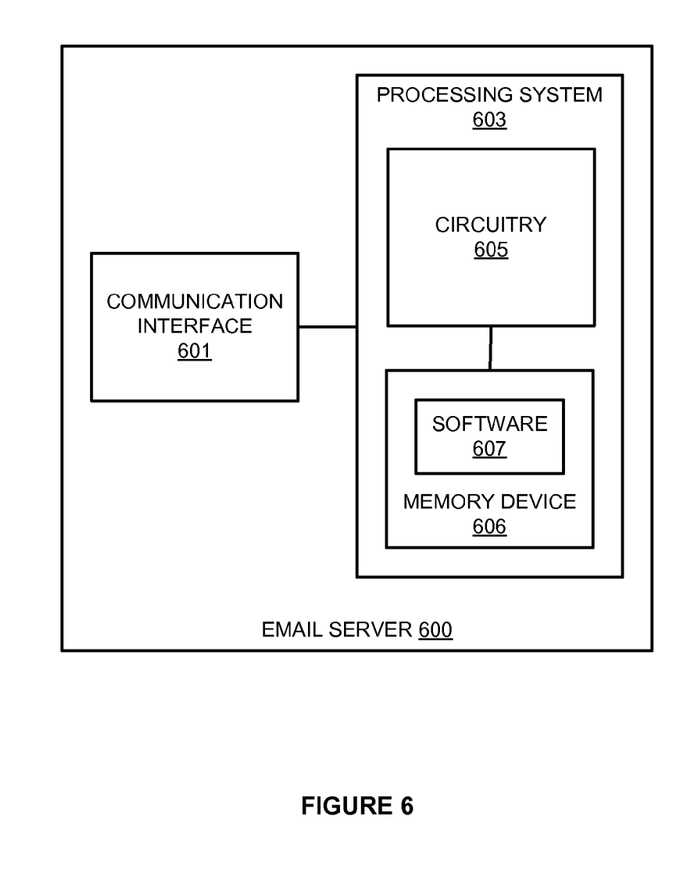
FIG. 6 is a block diagram that illustrates an email server.

FIG. 6 is a block diagram that illustrates email server 600. Email server 600 provides an example of email server 130, although server 130 may use alternative configurations. Email server 600 comprises communication interface 601 and processing system 603. Processing system 603 is linked to communication interface 601. Processing system 603 includes processing circuitry 605 and memory device 606 that stores operating software 607.

Communication interface 601 comprises components that communicate over communication links, such as network cards, ports, RF transceivers, processing circuitry and software, or some other communication components. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

Processing circuitry 605 comprises microprocessor and other circuitry that retrieves and executes operating software 607 from memory device 606. Memory device 606 comprises a disk drive, flash drive, data storage circuitry, or some other memory apparatus. Processing circuitry 605 is typically mounted on a circuit board that may also hold memory device 606 and portions of communication interface 601. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate email server 600 as described herein. In particular, operating software 607 directs processing system 603 to direct communication interface 601 to receive first and second email auto-reply instructions from a wireless communication device.

Figure 7:
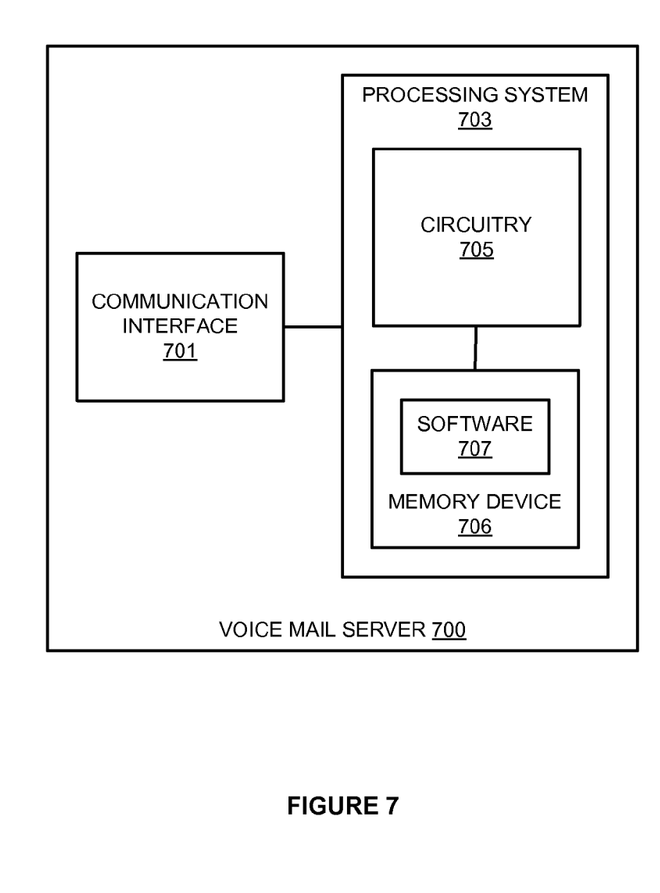
FIG. 7 is a block diagram that illustrates a voice mail server.

FIG. 7 is a block diagram that illustrates voice mail server 700. Voice mail server 700 provides an example of voice mail server 140, although server 140 may use alternative configurations. Voice mail server 700 comprises communication interface 701 and processing system 703. Processing system 703 is linked to communication interface 701. Processing system 703 includes processing circuitry 705 and memory device 706 that stores operating software 707.

Communication interface 701 comprises components that communicate over communication links, such as network cards, ports, RF transceivers, processing circuitry and software, or some other communication components. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

Processing circuitry 705 comprises microprocessor and other circuitry that retrieves and executes operating software 707 from memory device 706. Memory device 706 comprises a disk drive, flash drive, data storage circuitry, or some other memory apparatus. Processing circuitry 705 is typically mounted on a circuit board that may also hold memory device 706 and portions of communication interface 701. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate voice mail server 700 as described herein. In particular, operating software 707 directs processing system 703 to direct communication interface 701 to receive first and second voice mail greeting instructions from a wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
a user interface;
a wireless communication interface;
a processing system configured to receive a first email auto-reply instruction through the user interface, and in response, direct the wireless communication interface to transfer the first email auto-reply instruction for delivery to an email server, wherein the processing system is further configured in response to the first email auto-reply instruction to convert the first email auto-reply instruction into a voice mail greeting and direct the wireless communication interface to transfer a first voice mail greeting instruction for delivery to a voice mail server; and
the processing system configured to receive a second voice mail greeting instruction through the user interface, and in response, direct the wireless communication interface to transfer the second voice mail greeting instruction for delivery to the voice mail server, wherein the processing system is further configured in response to the second voice mail greeting instruction to convert the second voice mail greeting instruction into an email auto-reply and into a Short Message Service (SMS) auto-reply and direct the wireless communication interface to transfer a second email auto-reply instruction for delivery to the email server and transfer an SMS auto-reply instruction for delivery to an SMS server.

2. The wireless communication device of claim 1 wherein the processing system is further configured to receive a selection of a plurality of contacts through the user interface, and in response to the selection, the second email auto-reply instruction directs the email server to only present the email auto-reply in response to email received from the plurality of contacts.

3. The wireless communication device of claim 2 wherein the plurality of contacts comprise a predetermined group of contacts.

4. The wireless communication device of claim 2 wherein the plurality of contacts comprise a predetermined type of contacts.

5. The wireless communication device of claim 1 wherein the processing system is further configured to present the voice mail greeting through the user interface, receive a first user acceptance of the voice mail greeting through the user interface, present the email auto-reply through the user interface, receive a second user acceptance of the email auto-reply through the user interface, and present the SMS auto-reply through the user interface.

6. The wireless communication device of claim 5 wherein the processing system is further configured to receive a third user acceptance of the SMS auto-reply through the user interface, and wherein the processing system configured to direct the wireless communication interface to transfer the SMS auto-reply instruction for delivery to the SMS server comprises the processing system configured to direct the wireless communication interface to transfer the SMS auto-reply instruction for delivery to the SMS server in response to the third user acceptance.

7. The wireless communication device of claim 6 wherein the SMS auto-reply instruction directs the SMS server to only present the SMS auto-reply in response to SMS messages from known contacts.

8. The wireless communication device of claim 1 wherein the processing system is further configured in response to the second voice mail greeting instruction to convert the second voice mail greeting instruction into an Instant Messaging (IM) status update and present the IM status update through the user interface.

9. The wireless communication device of claim 8 wherein the processing system is further configured to receive a third user acceptance of the IM status update through the user interface, and in response to the third user acceptance, direct the wireless communication interface to transfer an IM status update instruction for delivery to an IM server.

10. The wireless communication device of claim 9 wherein the IM status update instruction directs the IM server to only present the IM status update in response to instant messages from known contacts.

11. A method of operating a wireless communication device, the method comprising:
receiving a first email auto-reply instruction through a user interface, and in response, transferring the first email auto-reply instruction for delivery to an email server;
in response to the first email auto-reply instruction, converting the first email auto-reply instruction into a voice mail greeting;
transferring a first voice mail greeting instruction for delivery to a voice mail server;
receiving a second voice mail greeting instruction through the user interface, and in response, transferring the second voice mail greeting instruction for delivery to the voice mail server;
in response to the second voice mail greeting instruction, converting the second voice mail greeting instruction into an email auto-reply and into a Short Message Service (SMS) auto-reply;
transferring a second email auto-reply instruction for delivery to the email server; and
transferring an SMS auto-reply instruction for delivery to an SMS server.

12. The method of claim 11 further comprising receiving a selection of a plurality of contacts through the user interface, and in response to the selection, the second email auto-reply instruction directs the email server to only present the email auto-reply in response to email received from the plurality of contacts.

13. The method of claim 12 wherein the plurality of contacts comprise a predetermined group of contacts.

14. The method of claim 12 wherein the plurality of contacts comprise a predetermined type of contacts.

15. The method of claim 11 further comprising presenting the voice mail greeting through the user interface, receiving a first user acceptance of the voice mail greeting through the user interface, presenting the email auto-reply through the user interface, receiving a second user acceptance of the email auto-reply through the user interface, and presenting the SMS auto-reply through the user interface.

16. The method of claim 15 further comprising receiving a third user acceptance of the SMS auto-reply through the user interface, and wherein transferring the SMS auto-reply instruction for delivery to the SMS server comprises transferring the SMS auto-reply instruction for delivery to the SMS server in response to the third user acceptance.

17. The method of claim 16 wherein the SMS auto-reply instruction directs the SMS server to only present the SMS auto-reply in response to SMS messages from known contacts.

18. The method of claim 11 further comprising, in response to the second voice mail greeting instruction, converting the second voice mail greeting instruction into an Instant Messaging (IM) status update and presenting the IM status update through the user interface.

19. The method of claim 18 further comprising receiving a third user acceptance of the IM status update through the user interface, and in response to the third user acceptance, transferring an IM status update instruction for delivery to an IM server.

20. A wireless communication device comprising:
a user interface;
a wireless communication interface;
a processing system configured to receive a first email auto-reply instruction through the user interface, and in response, direct the wireless communication interface to transfer the first email auto-reply instruction for delivery to an email server, wherein the processing system is further configured in response to the first email auto-reply instruction to convert the first email auto-reply instruction into a voice mail greeting and present the voice mail greeting through the user interface, wherein the processing system is further configured to receive a first user acceptance of the voice mail greeting through the user interface, and in response to the first user acceptance, to direct the wireless communication interface to transfer a first voice mail greeting instruction for delivery to a voice mail server;

the processing system configured to receive a second voice mail greeting instruction through the user interface, and in response, direct the wireless communication interface to transfer the second voice mail greeting instruction for delivery to the voice mail server, wherein the processing system is further configured in response to the second voice mail greeting instruction to convert the second voice mail greeting instruction into an email auto-reply and present the email auto-reply through the user interface, wherein the processing system is further configured to receive a second user acceptance of the email auto-reply through the user interface, and in response to the second user acceptance, direct the wireless communication interface to transfer a second email auto-reply instruction for delivery to the email server;

the processing system configured in response to the second voice mail greeting instruction to convert the second voice mail greeting instruction into a Short Message Service (SMS) auto-reply and present the SMS auto-reply through the user interface, wherein the processing system is further configured to receive a third user acceptance of the SMS auto-reply through the user interface, and in response to the third user acceptance, direct the wireless communication interface to transfer an SMS auto-reply instruction for delivery to an SMS server; and the processing system configured in response to the second voice mail greeting instruction to convert the second voice mail greeting instruction into an Instant Messaging (IM) status update and present the IM status update through the user interface, wherein the processing system is further configured to receive a fourth user acceptance of the IM status update through the user interface, and in response to the fourth user acceptance, direct the wireless communication interface to transfer an IM status update instruction for delivery to an IM server.

* * * * *